(12) United States Patent
Ra et al.

(10) Patent No.: US 8,451,838 B2
(45) Date of Patent: May 28, 2013

(54) APPARATUS AND METHOD FOR FORWARDING PACKET IN PACKET SWITCH SYSTEM

(75) Inventors: Yong Wook Ra, Jeonlabuk-do (KR); Hak Suh Kim, Daejeon (KR); Byung Jun Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1076 days.

(21) Appl. No.: 11/936,201

(22) Filed: Nov. 7, 2007

(65) Prior Publication Data

US 2008/0130648 A1 Jun. 5, 2008

(30) Foreign Application Priority Data

Dec. 4, 2006 (KR) .................. 10-2006-0121828

(51) Int. Cl.
*H04L 12/28* (2006.01)
*H04L 12/56* (2006.01)
*H04L 12/54* (2006.01)
*G06F 13/10* (2006.01)

(52) U.S. Cl.
CPC .............. *H04L 12/56* (2013.01); *G06F 13/10* (2013.01)
USPC ........................................... 370/392

(58) Field of Classification Search
None
See application file for complete search history.

(56) References Cited

U.S. PATENT DOCUMENTS

| | | | | |
|---|---|---|---|---|
| 4,995,033 A * | 2/1991 | Ikemori | | 370/439 |
| 7,035,277 B1 * | 4/2006 | Batcher | | 370/447 |
| 7,539,750 B1 * | 5/2009 | Parker et al. | | 709/224 |
| 2003/0172169 A1 * | 9/2003 | Cheng | | 709/230 |
| 2004/0139288 A1 * | 7/2004 | Perego et al. | | 711/154 |
| 2004/0141524 A1 | 7/2004 | Lee et al. | | |
| 2004/0249803 A1 * | 12/2004 | Vankatachary et al. | | 707/3 |
| 2006/0182214 A1 * | 8/2006 | Hwang et al. | | 375/359 |

FOREIGN PATENT DOCUMENTS

| | | |
|---|---|---|
| JP | 2006180246 | 7/2006 |
| KR | 1020010076079 | 8/2001 |
| KR | 1020020070180 | 9/2002 |
| KR | 1020030089935 | 11/2003 |
| KR | 1020040065000 | 7/2004 |
| KR | 1020050072642 | 7/2005 |

OTHER PUBLICATIONS

S. Deering, et al; "Internet Protocol, Version 6 (IPv6) Specification;" Internet RFCs, 1995.

* cited by examiner

*Primary Examiner* — John Blanton
*Assistant Examiner* — Christopher Crutchfield
(74) *Attorney, Agent, or Firm* — Ladas & Parry LLP

(57) ABSTRACT

A packet forwarding apparatus forwards packets by hardware implementation in a packet switch system for an internet protocol service. In the packet forwarding apparatus, an interface transmits/receives a packet through interfacing with a data link layer. A bus operator converts the packet received from the interface by a pre-set logic. A header parser parses a header of the converted packet. A network search engine controller receives a parsed result and the packet from the header parser and controls a command for forwarding the packet by interworking with an external network search engine and a processor.

15 Claims, 7 Drawing Sheets

APPARATUS AND METHOD FOR FORWARDING PACKET IN PACKET SWITCH SYSTEM

CLAIM OF PRIORITY

This application claims the benefit of Korean Patent Application No. 2006-121828 filed on Dec. 4, 2006 in the Korean Intellectual Property Office, the disclosure of which is incorporated herein by reference.

BACKGROUND OF THE INVENTION

1. Field of the Invention

The present invention relates to an apparatus and method for forwarding packets, more particularly, which can forward the packets based on an internet protocol version 6 (IPv6) by hardware implementation in place of conventional software implementation in a packet switch system.

This work was supported by the IT R&D program of MIC/IITA [2005-S-101-02, Multimedia QOS Routing Technology Development]

2. Description of the Related Art

With an explosive increase in data traffic and IP nodes resulting from popularized internet, 32-bit Internet Protocol Version 4 (IPv4) addresses have been depleted. To overcome this, in the early 1960s, the Internet Engineering Task Force (IETF) sought for a protocol to replace an IPv4 protocol and developed an IPv6. The IPv6 protocol was designed by adding new features to the IPv4 protocol based on experiences accumulated from design of the IPv4.

However, the IPv6 protocol is mostly implemented in software. In other words, in conventional software implementation of the IPv6 protocol, a packet received from a lower layer is copied and stored in a memory and then processed. Here, data is transmitted between layers by memory buffer chaining using a pointer. Therefore, the conventional software implementation of the IPv6 protocol may degrade performance of a system and pose a difficulty in maintaining a wire speed.

FIG. 1 illustrates a structure of a conventional internet protocol version 6 (IPv6) input module.

In a conventional IPv6 processor device, the input module includes a media access controller (MAC) 20 for controlling interface with a data link layer, a processor 11 for processing input data, a pointer 12 having a stored memory address and a memory 13 for storing the input data.

In the IPv6 input module structured as described above, when the MAC 20, which processes the data link layer and a physical layer, collects data corresponding to one frame, the MAC 20 uses a CRC checksum to determine whether the frame is defective. If the frame is not defective, the MAC 20 transmits a packet via a dedicated interrupt terminal to a machine 10. The processor 11 in the machine 20 receives data from the memory 13 using the pointer 13, processes the received data, and overwrites a location in the memory 13 with the processed data. In this fashion, packet processing in each layer is achieved through memory overwrites.

FIG. 2 illustrates a format of a conventional IPv6 basic header. The IPv6 header includes a version field for a 4-bit, a 8-bit traffic class field, a 20-bit flow label field related to QoS (quality of service), a 16-bit unsigned integer payload length field for indicating the length of contents, an 8-bit next header (NH) field for indicating what type of extension header follows, an 8-bit unsigned integer hop limit field decremented by one by each node that forwards the packet, a source address field containing the 128 bit address of the sender of the packet, and a destination address field containing the 128 bit address of the receiver of the packet.

However, this software implementation of IPv6 indispensably requires a memory for storing the packet. This accordingly lengthens latency resulting from a large number of memory accesses, thereby generating a considerable overhead in a TCP/IP-ported machine.

As a conventional technology to overcome this problem, Korean Laid-open Patent Application No. 10-2004-0065000, entitled "IPv6 header receiving apparatus and IPv6 header processing method" discloses processing of header information by hard implementation. However, this technology still requires software implementation of look-up and processing for packet forwarding.

Also, in another conventional technique, a forwarding control apparatus based on an IP look-up device has been developed. Implementation of this apparatus mainly involves a controlling method such as generation, addition and deletion of the look-up device. In a case where there are simultaneous requests for forwarding IP packets through actual data path and updating a lookup table trough the CPU path, the forwarded IP packets suffer loss. Moreover, this apparatus appears to be a hardware forwarding apparatus due to use of external memories. But except for the external memories, the apparatus is implemented and controlled by software.

Further another conventional technology concerns an apparatus for forwarding packets in an Ethernet-based router. Here, a forwarding control device is implemented using a dual port memory such that the packet is forwarded by hardware implementation without memory copying to maintain a wire speed. However, a pointer arbitrator is a simple dual port memory device which controls writing and reading of the input packet and does not allow update of a look-up table when the input packet is forwarded. That is, when a network configuration is changed or the look-up table needs updating while the packet is forwarded, the packet should be stopped from being forwarded or otherwise suffers loss.

Therefore, the conventional IPv6 packet forwarding apparatus achieves the IPv6 packet forwarding by software or implements only a processing method of an IPv6 header by hardware. This renders it hard to maintain a wire speed in the actual IPv6 packet forwarding, thereby degrading performance of a system. Moreover, the system should perform with higher capability these days due to an incessantly faster wire speed, predominance of a giga-bit switch and emergence of a switch supported by 10-giga bit port as an up link.

SUMMARY OF THE INVENTION

The present invention has been made to solve the foregoing problems of the prior art and therefore an aspect of the present invention is to provide an apparatus and method for forwarding IPv6 packets by hardware implementation in place of conventional software implementation in a packet switch system.

According to an aspect of the invention, the invention provides a packet forwarding apparatus for forwarding packets by hardware implementation in a packet switch system for an internet protocol service, the packet forwarding apparatus including an interface for transmitting/receiving a packet through interfacing with a data link layer; a bus operator for converting the packet received from the interface by a pre-set logic; a header parser for parsing a header of the converted packet; and a network search engine controller for receiving a parsed result and the packet from the header parser and controlling a command for forwarding the packet by interworking with an external network search engine and a processor.

According to another aspect of the invention, the invention provides a method of forwarding an input packet in a packet forwarding apparatus for forwarding packets by hardware implementation in a packet switch system for an internet protocol service, the method including converting the packet inputted through interfacing with a data link layer by a pre-set logic; parsing a header of the converted packet; and controlling data search and a processor command for forwarding of the packet based on the parsed result.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 1:
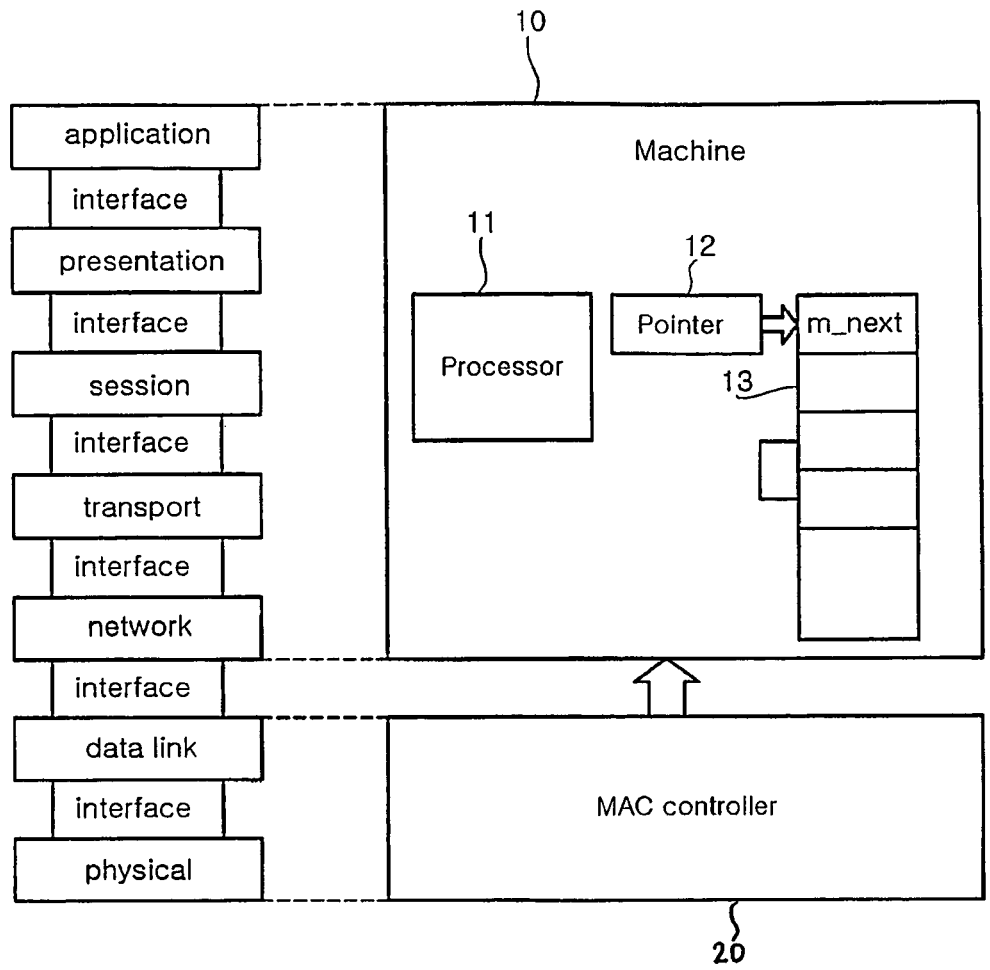
FIG. 1 illustrates a conventional internet protocol version 6 (IPv6) input module.
Figure 2:
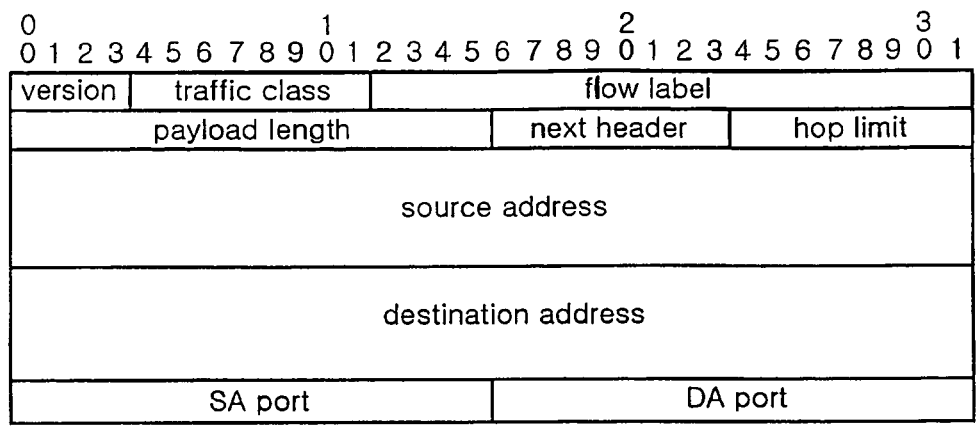
FIG. 2 illustrates a format of a conventional IPv6 basic header.

Exemplary embodiments of the present invention will now be described in detail with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference signs are used to designate the same or similar components throughout.

A description will be given of the embodiments of the invention which adopt a packet switch system based on an internet protocol version 6 (IPv6). A more detailed description will be given of an IPv6 packet forwarding apparatus in the packet switch system with reference to the accompanying drawings.

Figure 3:
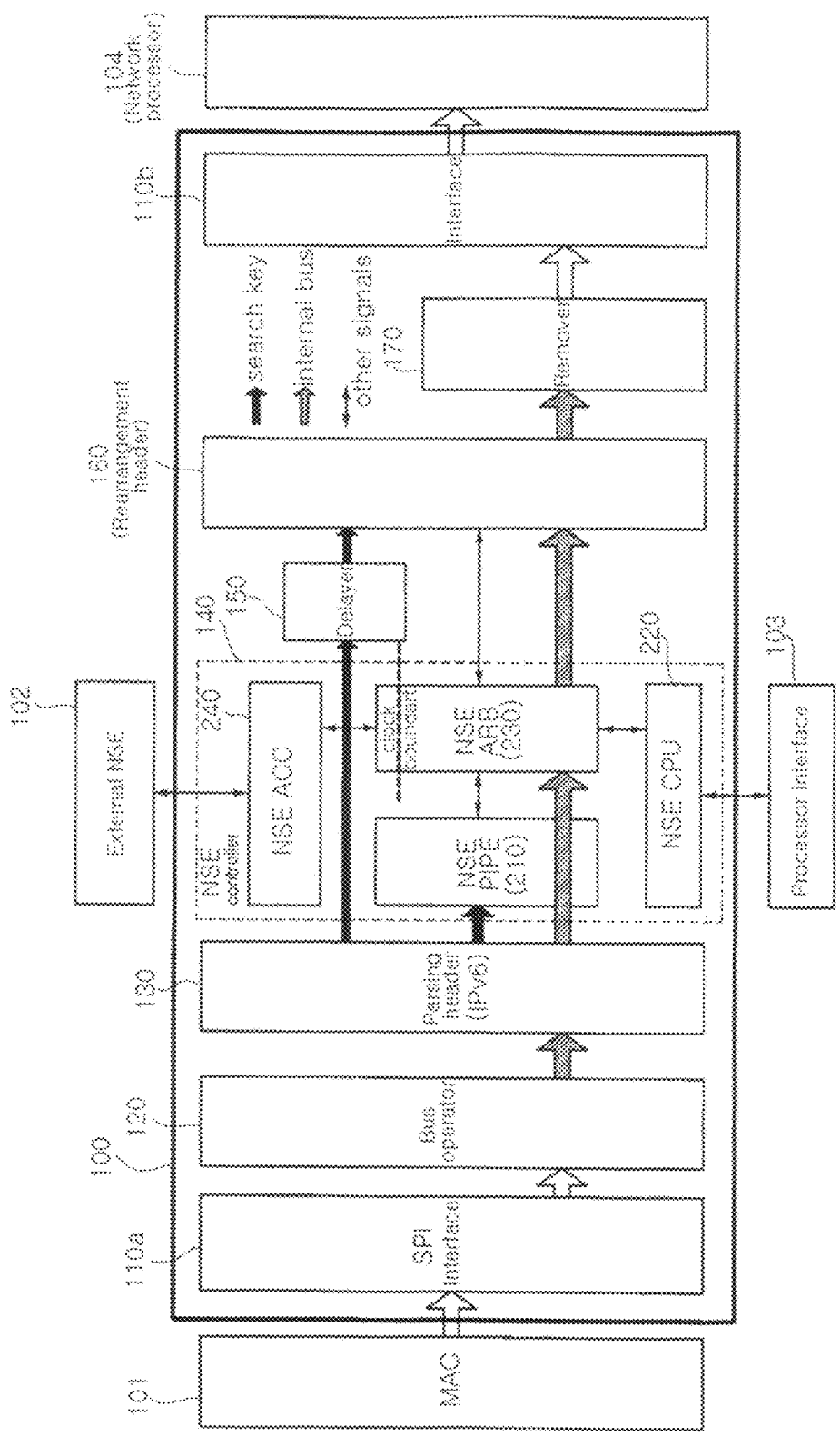
FIG. 3 is a configuration view illustrating an IPv6 packet forwarding apparatus according to an embodiment of the invention.

FIG. 3 is a configuration view illustrating an IPv6 packet forwarding apparatus according to an embodiment of the invention.

Referring to FIG. 3, the IPv6 packet forwarding apparatus 100 includes an interface 110, a bus operator 120, a header parser 130, a network search engine controller 140, a pipe delay or a delayer 150, a rearrangement header 160 and a transitional remover or a remover 170. The IPv6 packet forwarding apparatus may operate in association with a media access controller (MAC) 101, an external network search engine (NSE) 102, a processor interface 103 and a network processor 104.

The interface 110 includes a receiver 110a and a transmitter 110b. The interface 110 enables the MAC 101 interworking with the receiver 110a to interfere with the network processor 104 interworking with the tramsmitter 110b. Also, the interface 110 processes an ingress packet from a 1-gigabit Ethernet or 10-gigabit Ethernet MAC 317 chip through a serial peripheral interface (SPI).

The bus operator 120 converts the packet inputted from the interface 110a by an internal bus logic with an 8-bit mask pattern.

The header parser 130 parses a header of the IPv6 packet inputted to support a flow state of the IPv6 and quality of service (QoS). Then, the header parser 130 transfers a parsed result and the received packet to a network search engine controller.

The network search engine (NSE) controller 140 enables the IPv6 packet forwarding apparatus to execute reading, writing and search from the external NSE 102. Specifically, the NSE controller 140 arbitrates IP packet forwarding through a data pass, lookup table update through a processor (CPU) pass (data search command) and reading/writing access (processor command). Then, the NSE controller 140 controls the IP packet, inputted through arbitration, to be forwarded without loss by flow control. Also, the NSE controller 140 provides a multi search key loading in addition to a single search key loading to support services such as a longest prefix matching (LPM), quality of service (QoS) and denial of service (DoS).

The delayer 150 enables synchronization of the forwarded packet so as to match latencies of indexes (results of route ID, DoS ID, QoS ID) obtained through the look-up from the external NSE 102, and the forwarded IPv6 packet.

The rearrangement header 160 inserts a hash value and Route ID, DoS ID, and QoS ID obtained from the external NSE 102 to enable the external network processor or packet processor 104 to recognize various flows, and rearranges the IPv6 packet header. Herein, a hash key value used by a hash function includes a 4-bit 'port number' of the inputted packet, a 12-bit 'VLAN ID,' 256-bit 'IPSA' and 'IPDA,' an 8-bit 'Next Header.' In a case where a value of 'Next Header' indicates TCP or UDP, the hash value is a 32-bit 'L4 Port,' and in a case where a value of 'Flow Label' is not 0, the hash value is 'Flow Label.'

The remover 170 removes various overheads inserted for internal processing. The remover 170 identifies mask information in an internal bus and removes a byte of the mask information where a mask value is 0.

In the IPv6 forwarding apparatus structured as above, the NSE controller 140 will be described in more detail with reference to FIG. 4.

Figure 4:
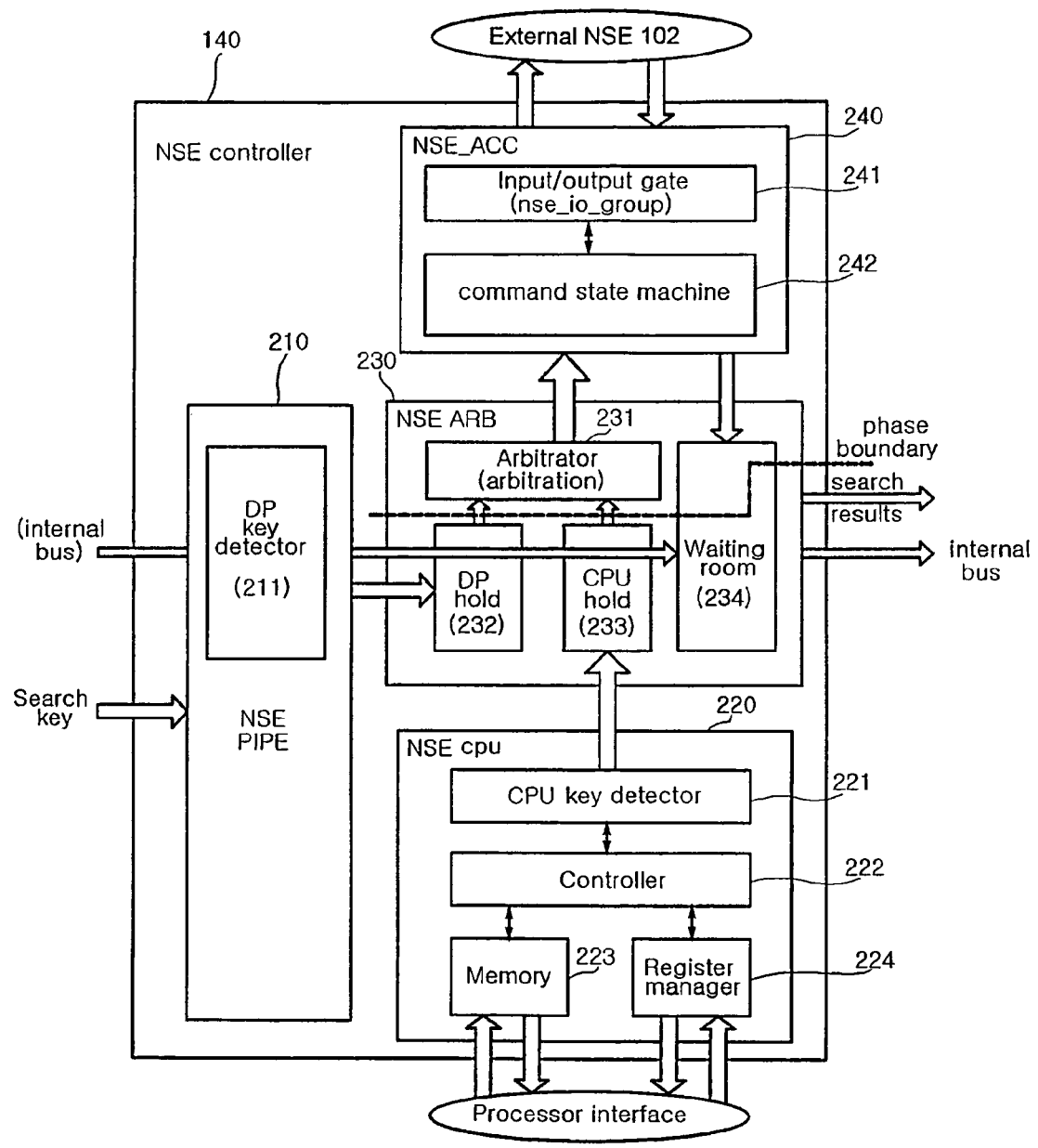
FIG. 4 is a configuration view illustrating an network search engine (NSE) controller of FIG. 3.

As shown in FIG. 4, the NSE controller 140 largely includes an NSE pipe 210, an NSE processor CPU 220, an NSE arbitrator ARB 230, and an NSE accessor ACC 240.

The NSE pipe 210 provides a key value for searching a packet inputted through an internal bus. The NSE pipe 210 includes a data pass (DP) key detector 211 for generating a key value necessary for look-up from the inputted packet.

The NSE processor 220 performs interfacing with a processor, executes writing and reading commands from the processor and generates a key value for each command. The NSE processor 220 includes a processor (CPU) key detector 221, a controller 222, a memory 223 and a register manager 224. The processor key detector 221 detects the key value according to a processor command language. The controller 222 controls interfacing with the processor. The memory 223, if the process command language is the writing command, stores address and data of an external NSE received from the external processor. Also, the controller 222, if the process command language is the reading command, stores address of the external NSE and data received therefrom. The register manager 224 manages various registers.

The NSE arbitrator 230 arbitrates a search command language for the data packet inputted and processor command languages for reading and writing, and eliminates a phase difference generated when passing a clock boundary. The NSE arbitrator 230 includes an arbitration or an arbitrator 231, a data pass hold 232, a processor pass hold 233 and a waiting room 234. The arbitrator 231 arbitrates a data pass search command language and the processor command language. The data pass hold 232 stores the key value necessary for detecting various data and eliminates a phase difference generated when passing the clock boundary. The processor pass hold 233 stores a command message for the various processor commands. The waiting room 234 maintains the packet while receiving a result value for the search.

The NSE accessor 240 interfaces with the external NSE 102 and loads the key values for actual command languages. Also, the NSE accessor 240 includes an NSE input/output group or input/output gate 241 and a command state machine or a command language selector 242. The input/output gate (NSE IO group) 241 physically interfaces with the external NSE chip. The command language selector 242 makes a selection from various command languages such as data searching, reading and writing command languages.

In the packet switch system structured as described above according the embodiment of the invention, the IPv6 forwarding apparatus can forward packets by hardware implementation in place of conventional software implementation. Now, a description will be given of a method for forwarding a packet, i.e., a process for forwarding the packet inputted through the hardware-implemented apparatus without suffering loss.

In the IPv6 packet forwarding apparatus, the interface 110 receives the packet through interfacing with a data link layer to forward to the bus operator 120. In turn, the bus operator 120 assigns an 8-bit mask pattern to an internal interface logic and converts the input packet by the logic. The converted packet is inputted to the header parser 130. Correspondingly, the header parser 130 derives an IPv6 packet header from the inputted packet to support IPv6 flow state and QoS, parses and processes each field and forwards a parsed result and the packet to the NSE controller 140.

Then, based on the parsed result forwarded, the NSE controller 140 initializes/updates Ipv6 packet forwarding through a data pass (DP) and a lookup table through a processor pass. That is, the NSE controller 140 executes a data search command and a processor command for reading/writing access. Here, the NSE controller 140 arbitrates the data search command and the processor command according to priority. This allows the IPv6 forwarding packet inputted through this arbitration to be forwarded without any loss by flow control. In the case of the data search command, the NSE controller 140 combines key values for data search in response to a control signal to decide whether to execute a single look up (LPM) or a multi-look up (LPM/QoS/DoS) and loads the IPv6 keys from the inputted packet, thereby eliminating a phase difference generated when the key values are transmitted to the external NSE 102.

The packet forwarded from the NSE controller 140 is transported to the rearrangement header 160. Here, latencies generated between indexes obtained through search by the external network search engine and the forwarded packet are matched together to synchronize the packet. In turn, the rearrangement header 160 inserts the indexes provided through a hash value and a look-up to be processed according to flows into the synchronized packet so that the external processor, i.e., network processor (NP) 104 or packet processor (PP), recognize various flows. Then the rearrangement header 160 rearranges a header of the packet. Thereafter, the remover 170 removes an overhead for internal processing and a byte of mask information where a mask value is 0, from the packet including the rearrangement header, and forwards the packet to the external processor 104.

Now, a more detailed description will be given of operation of the NSE controller 140 in a process for forwarding the packet in the IPv6 packet forwarding apparatus. First, a detailed description will be given of a process for executing a processor command inputted through the external processor interface 103 in the NSE processor 220 with reference to the accompanying drawings.

Figure 5:
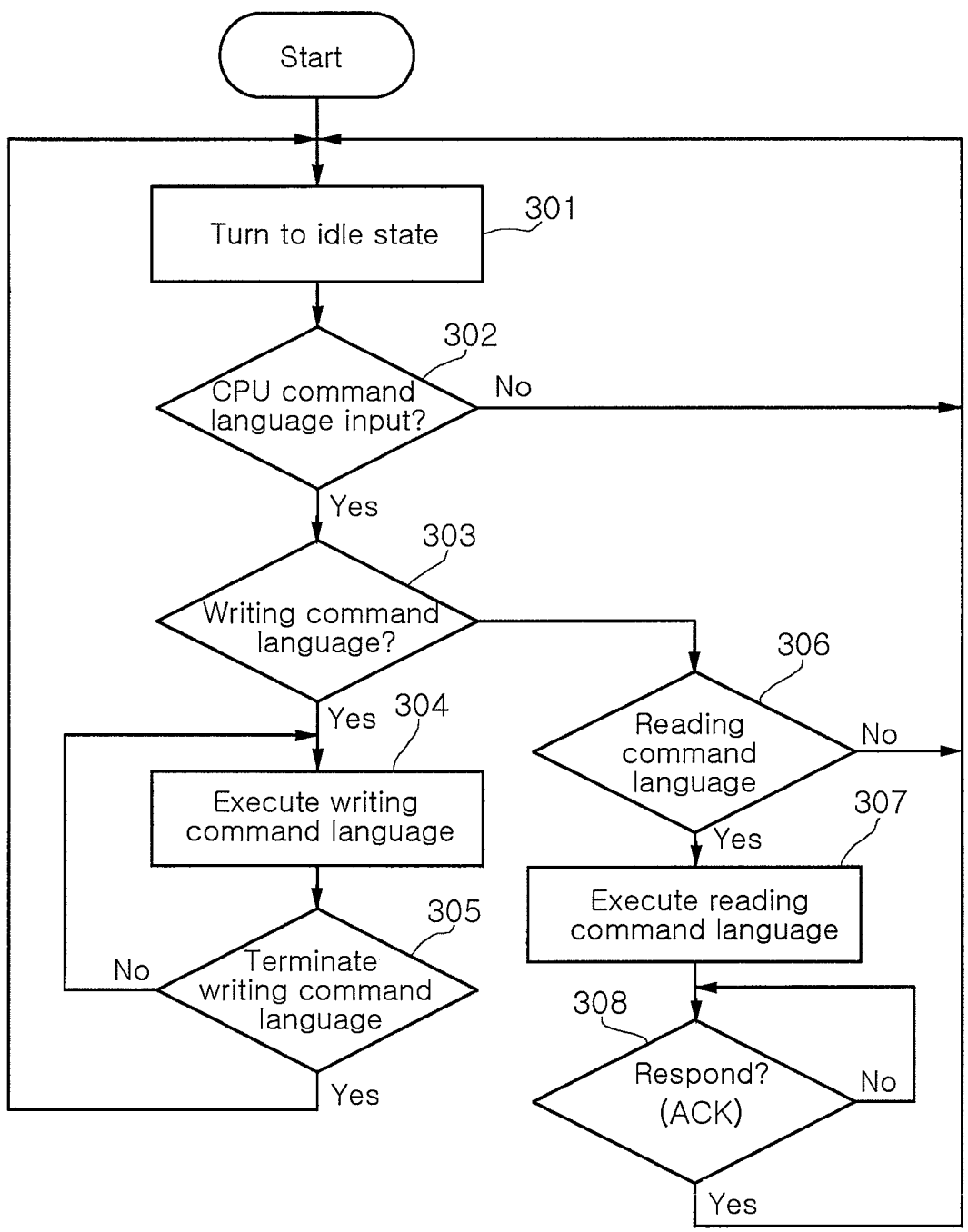
FIG. 5 is a flow chart illustrating a process of processing a processor command language in an NSE controller according to another embodiment of the invention.

FIG. 5 is a flow chart illustrating a process for processing a processor command language in the NSE controller according to an embodiment of the invention.

Referring to FIG. 5, the NSE processor 220 in the NSE controller 140 converts a current state into an IDLE state if a power is supplied in operation 301. Then, the NSE processor 220 confirms whether a processor command language or CPU command language is inputted from a processor through the external processor interface 103 in operation 302. If the processor command language is not inputted, the NSE processor 220 resumes operation 301, and if the processor command language is inputted, the NSE processor executes operation 303.

Then the NSE processor 220 confirms whether the inputted processor command language is a writing command language in operation 303. If the inputted processor command language is the writing command language, the NSE processor 220 executes the writing command language in operation 304. Here, the NSE processor 220 execute writing according to the writing command language by dividing the writing operation into write 1 for writing a first command language in the memory 223 and write 2 for writing a final command language in the memory 223. Thereafter, the NSE processor 220 confirms whether the writing command language has been completed in execution in operation 305. If the execution is completed, the NSE processor 220 goes back to operation 301 and if the execution is not completed, the NSE processor 220 goes back to 304.

Meanwhile, if the input processor command language is not a writing command language in operation 303, the NSE processor 220 confirms whether the input processor command language is a reading command language in operation 306. If the input processor command is not the reading command language, operation 301 is resumed. If the input processor command language is the reading command language, the NSE processor executes the reading command language in operation 307. Subsequently, the NSE processor 220 performs "READ WAIT" to confirm whether it has received a response Ack from an external NSE 102 in operation 308. Here, if the NSE processor 220 has received the response, operation 301 is resumed, and if the NSE processor 220 has not received the response, operation 308 is executed continuously.

As described above, the NSE processor 220 executes the processor command language and generates a key value for a corresponding command language to provide to the NSE arbitrator. Accordingly, the NSE arbitrator of the NSE controller stores a command message for each processor command using the generated key value, arbitrates the processor command language, and eliminates a phase difference generated when passing a clock boundary. This arbitrating operation of the NSE arbitrator will be described with reference to the accompanying drawings.

Figure 6:
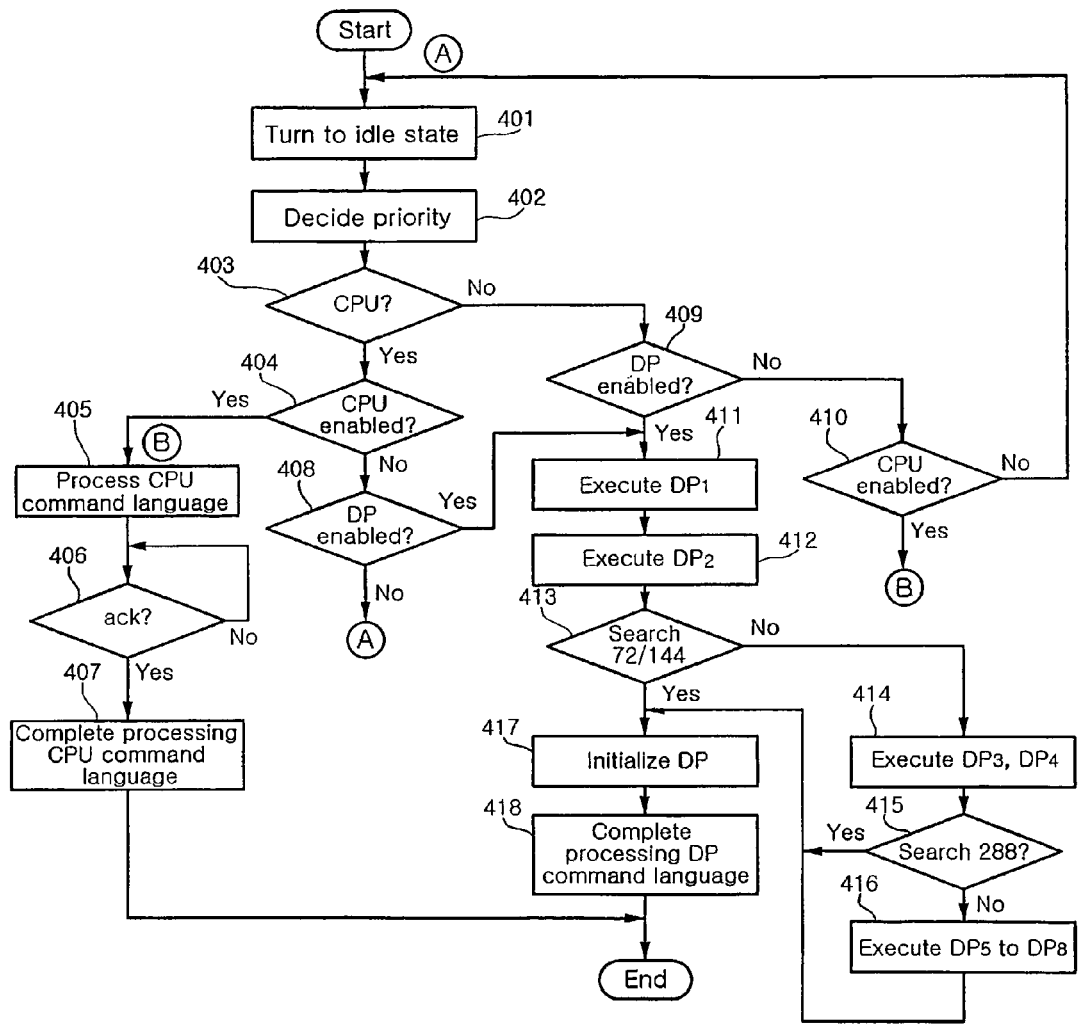
FIG. 6 is a flow chart illustrating an arbitrating process in an NSE controller according to embodiments of the invention.

FIG. 6 is a flow chart illustrating an arbitrating process of the NSE processor according to embodiments of the invention.

Referring to FIG. 6, the NSE arbitrator 231 of the NSE controller 140 is turned into an idle state when a power is supplied in operation 401. Then the NSE arbitrator 231 decides a priority between a data lookup command and a processor command in operation 402, and confirms whether a processor (CPU) pass has a higher priority in operation 403. If a data pass has a higher priority, the NSE arbitrator proceeds to operation 409. If the processor pass has a higher priority, the NSE arbitrator 230 checks whether the processor pass is enabled in operation 404. If the processor pass is enabled, the NSE arbitrator 230 executes the processor command language in operation 405, and then senses a response Ack signal from the external NSE 102 or a response Ack signal for completing the processor writing command language in operation 406. If the response signal is not sensed, the NSE arbitrator 230 continues to sense the response signal. If the response signal is sensed, the NSE arbitrator 230 completes executing the processor command language in operation 407 and the operation of the NSE arbitrator 230 is finished.

In the meantime, if the processor pass is not enabled in operation 404, the NSE arbitrator 230 checks whether the data pass DP is enabled in operation 408. If the data pass is not enabled, the NSE arbitrator 230 goes back to operation 401 and stands by. If the data pass is enabled, the NSE arbitrator 230 proceeds to operation 411.

If the data pass has a higher priority, the NSE arbitrator 230 checks whether the data pass DP is enabled in operation 409. If the data pass is not enabled, the NSE arbitrator 230 checks whether the processor pass is enabled in operation 410. If the processor pass is not enabled, the NSE arbitrator 230 resumes operation 401. If the process is enabled, the NSE arbitrator proceeds to operation 405 to execute the process command language.

Meanwhile, if the data pass is enabled in operation 409, the NSE arbitrator 230 executes a first data pass DP1, i.e., processes a first search command language in operation 411. Then, the NSE arbitrator 230 executes a second data pass DP2, i.e., a second search command in operation 412. Thereafter, the NSE arbitrator 230 ascertains a 72/144 bit search in operation 413. If the 72/144 bit search is not identified, the NSE arbitrator 230 executes third and fourth command languages DP3 and DP4 in operation 414. Subsequently, the NSE arbitrator 230 ascertains a 288 bit search in operation 415. If the 288 bit search is not ascertained, the NSE arbitrator 230 executes fifth to eighth command languages DP5 to DP8 in operation 416. Meanwhile, if the 288 bit search is identified in operation 415, the NSE arbitrator 230 proceeds to operation 417.

If the 72/144 bit search is ascertained in operation 413, the NSE arbitrator 230 initializes WAIT_DP a data pass with the data pass external NSE 102 in operation 417. Then, the NSE arbitrator 230 completes DONE_DP executing the data pass command language in operation 418.

Next, look-up operation in the NSE controller will be described with reference to the accompanying drawings.

Figure 7:
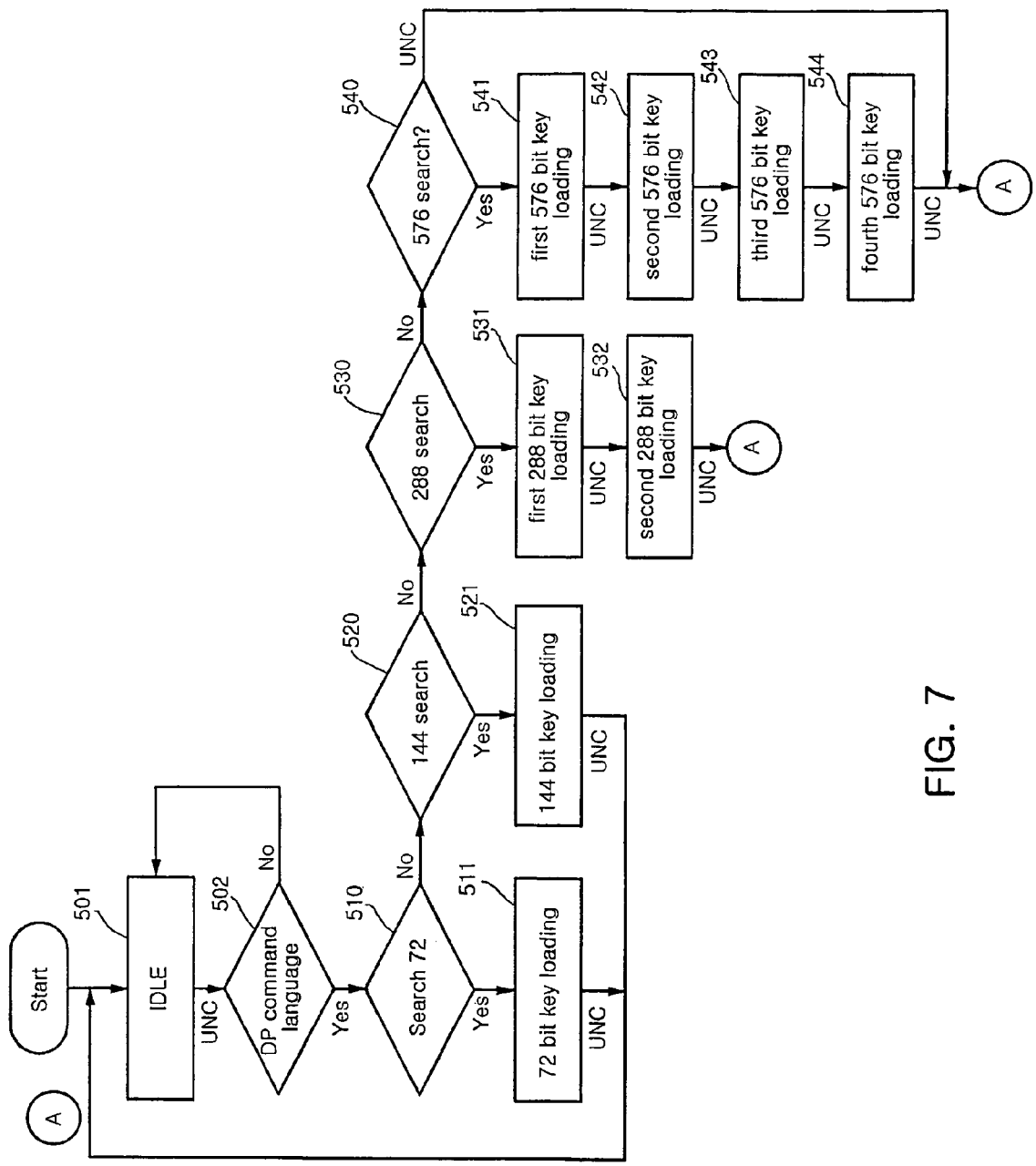
FIG. 7 is a flow chart illustrating a look-up process in an NSE controller according to embodiments of the invention.

FIG. 7 is a flow chart illustrating a look-up process in the NSE controller according to embodiments of the invention.

Referring to FIG. 7, the NSE controller 140 is turned into an idle state when a power is supplied in operation 501. Then the NSE arbitrator 230 of the NSE controller 140 confirms whether a data pass lookup command is enabled in operation 502. If the data pass lookup command is not enabled, operation 501 is resumed. If the data pass lookup command is enabled, the NSE controller 140 ascertains a 72-bit search in operation 510. If the 72 bit search is enabled, the NSE controller 140 loads a 72 bit key in operation 511 and goes back to operation 501 to stand in the idle state.

Meanwhile, if the 72-bit search is not enabled, the NSE controller 140 identifies a 144 bit search in operation 520. If the 144 bit search is enabled, the NSE controller 140 loads a 144 bit key in operation 521. If the 144 bit search is not enabled, the NSE controller 140 proceeds to operation 530 and identifies a 288 bit search. If the 288 bit search is enabled, the NSE controller 140 loads a first 144 bit key to load the 288 bit key in operation 531. Then the NSE controller 140 loads a second 144 bit key in operation 532 and goes back to operation 501 to stand in the idle state.

If the 288 bit search is not enabled in operation 530, the NSE controller 140 ascertains a 576 bit search in operation 540. If the 576 search is not enabled, the NSE controller resumes operation 501 to stand in the idle state. If the 576 bit search is enabled, the NSE controller 140 loads first to fourth 144-bit keys to load a 576 bit key in operation 541 to 544. Then the NSE controller 140 goes back to operation 501.

As described above, the NSE controller 140 executes a single search key loading and a multi search key loading to support a longest prefix matching (LPM), quality of service (QoS), denial of service (DoS). For example, the 72 bit/144 bit key loading is applied for a single LPM lookup using only an IP destination address. The 288/576 bit key loading is applied for a multi lookup such as an LPM/QoS/DoS lookup. Here, the key values used as the look-up key include a 128-bit IPv6 destination address, a 128-bit IPv6 source address, a 20-bit flow label, an 8-bit next header, an 8-bit traffic class, a 12-bit Vlan ID, a 4-bit port number, a 16-bit IPv6 source port, and a 16-bit IPv6 destination port. Therefore, the NSE controller 140 combines the key values in response to a control signal and decides whether to execute the single LPM look-up and the LPM/QoS/DoS multi look-up.

As set forth above, according to exemplary embodiments of the invention, an IPv6 forwarding apparatus forwards IPv6 packets by hardware implementation in place of conventional software implementation so that a system suffers no loss in its line speed. This also enables hard-ware control of longest prefix matching (LPM), quality of service (QoS), denial of service (DoS) lookup to process the IPv6 packets. This results in easier implementation of the system at a lower cost, thereby minimizing latency of multimedia applications and improving performance of the system.

While the present invention has been shown and described in connection with the preferred embodiments, it will be apparent to those skilled in the art that modifications and variations can be made without departing from the spirit and scope of the invention as defined by the appended claims.

What is claimed is:

1. A packet forwarding apparatus for forwarding packets by hardware implementation in a packet switch system for an internet protocol service, the packet forwarding apparatus comprising:
   an interface for transmitting/receiving a packet through interfacing with a data link layer;
   a bus operator for converting the packet received from the interface by a pre-set logic;

a header parser parsing a header of the converted packet to derive an IP header from the inputted packet; and a network search engine controller receiving a parsed result and the packet from the header parser and controlling a command for forwarding the packet by interworking with an external network search engine, which is searched according to a data search for the input packet, and a processor, which provides a processor command for updating a look-up table including information to be processed according to flows in the network search engine, wherein the network search engine controller controls each of the data search for searching the external network search engine for the inputted packet and the processor command for updating a look-up table including information to be processed according to flows of the external network search engine during the forwarding of the packet by maintaining the packet in the network search engine controller while performing arbitration to determine which of the data search for searching the external network search engine and the processor command for updating the look-up table including information to be processed according to flows is to be performed in the external network search engine.

2. The packet forwarding apparatus according to claim 1, further comprising:
   a delayer for enabling synchronization of the packet forwarded from the network search engine controller;
   a rearrangement header receiving the forwarded synchronized packet and the information to be processed according to flows from the network search engine controller and inserting the information to be processed according to flows into the synchronized packet and rearranging the header of the packet; and
   a remover for removing an overhead, inserted for internal processing, from the packet.

3. The packet forwarding apparatus according to claim 2, wherein the remover identifies mask information in the packet and removes a byte of the mask information where a mask value is 0.

4. The packet forwarding apparatus according to claim 2, wherein the information to be processed according to flows includes a route identifier (ID), a DoS index and a service quality identifier (QoS ID) provided through a hash value and a look-up.

5. The packet forwarding apparatus according to claim 1, wherein the network search engine controller comprises:
   a network search engine pipe for providing a key value for the data search based on the parsed result of the head parser;
   a network search engine processor interfacing with the processor, the processor being an external processor, the network search engine processor executing the processor command for updating the look-up table including information to be processed according to flows in the network search engine from the external processor and generating a key value according to the processor command for updating the look-up table including information to be processed according to flows in the network search engine;
   a network search engine arbitrator for arbitrating, based on priority, between the data search for the input packet and the processor command during the forwarding of the packet, and storing the key value generated according to the processor command; and
   a network search engine accessor for interfacing with the external network search engine, loading the key value generated according to the processor command, and selecting the arbitrated data search and processor command.

6. The packet forwarding apparatus according to claim 5, wherein the network search engine processor comprises:
   a processor key detector for detecting the key value for the processor command;
   a memory for storing data according to the processor command;
   a register manager for managing a register for processing the processor command; and
   a controller for controlling the interfacing with the external processor and the execution according to the processor command.

7. The packet forwarding apparatus according to claim 5, wherein the network search engine arbitrator comprises:
   a data pass hold for storing the key value for the data search and eliminating a phase difference generated when passing a clock boundary;
   a processor hold for storing information about the processor command;
   an arbitrator for arbitrating between the data search and the processor command; and
   a waiting room for maintaining the packet while receiving a result value for the data search.

8. The packet forwarding apparatus according to claim 5, wherein the network search engine accessor comprises:
   an input/output gate for interfacing with the external network search engine; and
   a command language selector for selecting the arbitrated data search and processor command and forwarding the selected result to the network search engine arbitrator.

9. A method of forwarding an input packet in a packet forwarding apparatus for forwarding packets by hardware implementation in a packet switch system for an internet protocol service, the method comprising:
   converting the packet inputted through interfacing with a data link layer by a pre-set logic;
   parsing a header of the converted packet; and
   controlling, by a network search engine controller interfaced with a network search engine and during the forwarding of the input packet, each of a data search to obtain information from a network search engine to be processed according to flows for the input packet and a processor command for updating the information to be processed according to flows, for forwarding of the packet based on the parsed result by maintaining the packet in the network search engine controller while performing arbitration to determine which of the data search for searching the external network search engine and the processor command for updating the look-up table including information to be processed according to flows in the external network search engine.

10. The method according to claim 9, further comprising:
    synchronizing the forwarded packet to match latencies of the information to be processed according to flows obtained through search of the external network search engine and the forwarded packet;
    inserting the information to be processed according to flows into the synchronized packet;
    rearranging the header of the packet; and
    removing an overhead inserted for internal processing from the packet.

11. The method according to claim 9, wherein the operation of controlling, during the forwarding of the input packet, the data search and the processor command for forwarding of the packet comprises:

detecting a key value for the data search of the packet based on the parsed result;
executing the processor command received through interfacing with an external processor;
arbitrating the data search for the packet and the processor command;
executing look-up for the data search in response to the arbitrating operation; and
loading a key value according to the processor command in response to the arbitrating operation.

12. The method according to claim 11, wherein the operation of executing the processor command received through interfacing with the external processor comprises:
identifying a type of a command language for the processor command if the processor command is inputted from the external processor;
generating the key value for the identified command language; and
executing the identified command language using the generated key value.

13. The method according to claim 11, wherein the operation of arbitrating the data search for the input packet and the processor command comprises:
storing the key value for the data search of the input packet;
storing command information for the processor command;
arbitrating the data search and the processor command using the stored key value for the data search and the command information; and
delaying the input packet while receiving a result of the data search.

14. The method according to claim 13, wherein the operation of arbitrating the data search and processor command comprises:
deciding a priority between a command for the data search and the processor command;
confirming whether a data pass of a high priority command is enabled;
processing a data pass command language if the data pass is enabled;
initializing a data pass with an external network search engine in a case where pre-set bit data is searched in the operation of processing the data pass command language;
confirming whether a processor pass of a high priority command is enabled;
processing a processor pass command language if the processor pass is enabled; and
completing the operation of processing the processor pass command language in response to a response signal from the external network search engine in the operation of processing the processor pass command language.

15. The method according to claim 11, wherein the operation of executing look-up for the data search in response to the arbitrating operation comprises:
confirming whether a data pass command for the data search is enabled; and loading a key value for searching a corresponding bit in response to pre-set bit data enabled if the data pass command is enabled.

* * * * *